(12) United States Patent
Bratton, Sr.

(10) Patent No.: US 7,163,214 B1
(45) Date of Patent: Jan. 16, 2007

(54) POOL TABLE CARRIAGE

(76) Inventor: John J. Bratton, Sr., 1737 W. Holt Ave. Space 23, Pomona, CA (US) 91768

( * ) Notice: Subject to any disclaimer, the term of this patent is extended or adjusted under 35 U.S.C. 154(b) by 709 days.

(21) Appl. No.: 10/638,923

(22) Filed: Aug. 11, 2003

(51) Int. Cl.
*A63B 71/00* (2006.01)

(52) U.S. Cl. .................. 280/79.11; 280/79.2; 473/4

(58) Field of Classification Search ............ 280/79.11, 280/79.2, 79.7, 47.34, 47.41, 2; 473/4
See application file for complete search history.

(56) References Cited

U.S. PATENT DOCUMENTS

| | | | | |
|---|---|---|---|---|
| 3,744,812 A | * | 7/1973 | Langhausen | 280/35 |
| 3,782,748 A | | 1/1974 | Poland | 280/35 |
| 3,988,021 A | * | 10/1976 | Grover | 473/15 |
| 5,125,626 A | * | 6/1992 | Lonsway et al. | 254/8 R |
| 5,405,236 A | | 4/1995 | Sundstrom et al. | 414/495 |
| 5,746,660 A | * | 5/1998 | Grover | 473/15 |
| 5,882,265 A | * | 3/1999 | Benton | 473/15 |
| 6,095,533 A | * | 8/2000 | Balolia | 280/35 |
| 6,109,625 A | * | 8/2000 | Hewitt | 280/43.24 |
| 6,857,968 B1 | * | 2/2005 | Fallack | 473/33 |
| 7,040,460 B1 | * | 5/2006 | Sherrill et al. | 188/5 |

* cited by examiner

*Primary Examiner*—Christopher P. Ellis
*Assistant Examiner*—Brian Swenson
(74) *Attorney, Agent, or Firm*—Goldstein Law Offices P.C.

(57) ABSTRACT

A pool table carriage for supporting a pool table at an elevated position above a horizontal support structure, and for transporting the pool table between locations without damaging the pool table. The pool table carriage comprises two support plate assemblies and a main frame interposed therebetween. Each support plate assembly selectively supports one of the legs of the pool table, when the pool table carriage is being deployed. Each support plate assembly further has four selectively extendable rotatable jackscrews, and two wheel assemblies each having wheels. The jackscrews are extendable in two opposite directions. Rotation of the jackscrew in one direction causes the jackscrew to retract upward, thereby allowing the wheels to contact the support structure, thereby allowing the pool table carriage to roll between different locations. Rotation of the jackscrew in the other direction causes the jackscrew to extend downward, thereby raising the wheels above the support structure, thereby immobilizing the pool table carriage.

11 Claims, 4 Drawing Sheets

POOL TABLE CARRIAGE

BACKGROUND OF THE INVENTION

1. Field of the Invention

The invention generally relates to a carriage for supporting and transporting heavy items, and in particular it relates to a carriage for supporting and transporting a pool table.

2. Description of the Related Art

Many millions of people play the game of pool, which requires a pool table. Pool tables are large, expensive items and are susceptible to damage while being moved between locations. Installing a pool table, however, is a major commitment of floor space. In addition to the space occupied by the table itself, considerable space must be left around the pool table. Accordingly, it is generally placed in the middle of a room. At times, however, it would be desirable to move the pool table away from the middle of the room, and toward the perimeter of the room. The pool table, however, is generally too heavy to allow such movement. In addition, the high risk of damage makes such frequent moves undesirable. Accordingly, there is a need for a pool table carriage for supporting and transporting a pool table between various locations without damaging the pool table.

A variety of pool table carriages are available. For example, U.S. Pat. No. 3,782,748 to Poland appears to show a pool table carriage having an adjustable telescoping frame for handling and transporting a pool table. Additionally, U.S. Pat. No. 5,125,626 to Lonsway appears to show a pool table carriage having four wheels and a pair of independently operable jacks each capable of selectively lifting a portion of the weight of the pool table above a floor after the carriage has been selectively wheeled under the pool table. Furthermore, U.S. Pat. No. 5,405,236 to Sundstrom appears to show a carriage device for use in transporting various articles including a pool table.

While these devices may be suitable for the particular purpose employed, or for general use, they would not be as suitable for the purposes of the present invention as disclosed hereafter.

SUMMARY OF THE INVENTION

It is an object of the invention to produce a pool table carriage for supporting and transporting a pool table between various locations without damaging the pool table. Accordingly, the pool table carriage has two support plate assemblies, each capable of selectively supporting one of the legs of the pool table, and each having wheels for allowing the pool table carriage to be selectively rolled between various locations without damaging the pool table.

It is another object of the invention to produce a pool table carriage which may be selectively immobilized upon a support structure such as a floor and leveled thereupon after the pool table carriage has been moved to a desired location. Accordingly, the pool table carriage has a plurality of selectively rotatable jackscrews, each having two directions of rotation. Rotation of the jackscrews in one of these directions causes the jackscrews to extend downward and engage the support structure, thereby lifting the wheels and immobilizing the pool table carriage upon the support structure, after the pool table carriage has been moved to a desired location.

Further objects of the invention will become apparent in the detailed description that follows.

The invention is a pool table carriage for supporting a pool table at an elevated position above a horizontal support structure, and for transporting the pool table between locations without damaging the pool table. The pool table carriage comprises two support plate assemblies and a main frame interposed therebetween. Each support plate assembly selectively supports one of the legs of the pool table, when the pool table carriage is being deployed. Each support plate assembly further has four selectively extendable rotatable jackscrews, and two wheel assemblies each having wheels. The jackscrews are extendable in two opposite directions. Rotation of the jackscrew in one direction causes the jackscrew to retract upward, thereby allowing the wheels to contact the support structure, thereby allowing the pool table carriage to roll between different locations. Rotation of the jackscrew in the other direction causes the jackscrew to extend downward, thereby raising the wheels above the support structure, thereby immobilizing the pool table carriage.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
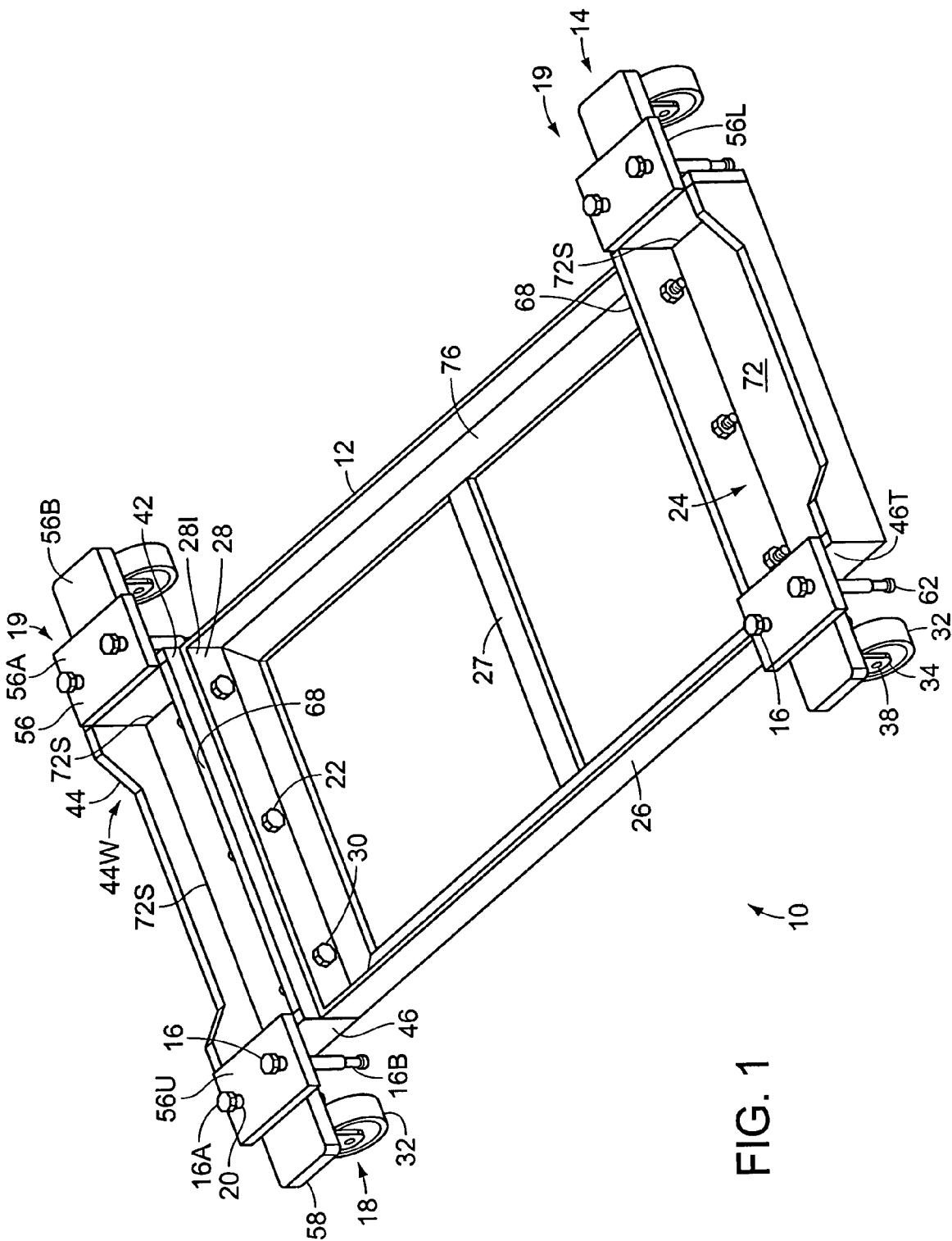
FIG. 1 is a perspective view of a pool table carriage per se.

FIG. 1 illustrates a pool table carriage 10, comprising two support plate assemblies 14 and a main frame 12 interposed therebetween. The pool table carriage 10 is used in conjunction with a pool table having two long sides, two short sides, a playing surface, and two legs for supporting said sides and said playing surface at an elevated position above a horizontal support structure such as a floor. The main frame 12 selectively and rigidly attaches the two support plate assemblies 14 to one another, as will be described. Each of the substantially rectangular support plate assemblies 14 is substantially identical. Hence, a description of one of the support plate assemblies 14 will suffice as a description of the other.

Each support plate assembly 14 has a substantially rectangular horizontal base 72 having four edges 72S. The support plate assembly 14 has an interior wall 68, an exterior wall 44, and two connecting walls 46 each having a top 46T, each of said walls 68, 44, and 46 extending vertically upward from a different edge 72S of said base 72. The connecting walls 46 perpendicularly extend from and connect the interior wall 68 to the exterior wall 44. The walls 68, 44, and 46 and the base 72 together define a box-like substantially rectangular leg support enclosure 24 which is open at the top, in order that a leg of the pool table may be selectively lowered therein and supported upon the base 72, while the pool table carriage 10 is being deployed. In use, the two legs of the pool table selectively rest upon the two bases 72 of the two leg support enclosures 24, when the pool table carriage 10 is used for transporting and supporting a pool table. The exterior walls 44 may be substantially rectangular. Alternately, the walls 44 may have a substantial wedge 44W removed therefrom, as illustrated in the drawing figures, for improving the aesthetic appeal of the pool table carriage 10 without detracting from its structural integrity.

Each support plate assembly 14 has two jackscrew and wheel assemblies 19, for selectively immobilizing the pool table carriage 10 upon a horizontal support structure. Each jackscrew and wheel assembly 19 has two vertical jackscrews 16 and one wheel assembly 18 having a wheel 32, said jackscrews 16 for selectively raising the wheels 32 above the surface of the floor in order to immobilize the pool table carriage 10, as will be described. One of the two jackscrew and wheel assemblies 19 on each support plate assembly 14 is attached to the top 46T of one of the connecting walls 46. The other jackscrew and wheel assembly 19 is attached to the top 46T of the opposing connecting wall 46. Each of the two jackscrew and wheel assemblies 19 are substantially identical. Hence, a description of one of the jackscrew and wheel assemblies 19 will suffice as a description of the other.

The jackscrew and wheel assembly 19 has a horizontally situated, substantially rectangular, two-tiered extension plate 56 extending perpendicularly outwards from the top 46T of the connecting wall 46. The extension plate 56 has an upper tier 56A having a lower surface 56L and an upper surface 56U, said upper tier 56A extending outwardly from the top 46T of the connecting wall 46, and a lower tier 56B attached to the lower surface 56L of said upper tier 56A and extending outwardly therefrom, said lower tier 56B being vertically closer to the floor when the pool table carriage 10 is deployed, relative to the upper tier 56A. The upper tier 56A is more proximal to the connecting wall 46 than is the lower tier 56B. The upper tier 56A and the connecting wall 46 from which it extends are preferably constructed from a single piece of metal, in order to confer enhanced stability to the support plate assembly 14.

The upper tier 56A has two threaded circular openings 20 extending fully between the upper surface 56U and the lower surface 56L. The upper tier 56A has two elongated, vertically aligned rotatable jackscrews 16 having threads which match those of the circular openings 20, each of said jackscrews 16 extending fully through and threaded within a different one of said circular openings 20, for selectively raising portions of the pool table carriage 10 above the floor, as will be described. Each jackscrew 16 has a first end 16A, and also a second end 16B which terminates in a soft pad 62 which selectively contacts the floor. The soft pad 62 is preferably constructed from Teflon. Each jackscrew 16 has two opposing directions in which it may be rotated by a user. Rotation of the first end 16A of the jackscrew 16 by the user in one direction causes the jackscrew 16 to extend downward within the circular openings 20 until the Teflon pad 62 pushes against the surface of the support structure and thereby causes the wheel assemblies 18 and their associated wheels 32 to be lifted above the support structure, thereby immobilizing the pool table carriage 10. The Teflon pads 62 protect the support structure from becoming damaged by the combined weight of the pool table carriage 10 and the pool table. Rotation of the jackscrew 16 in the opposite direction causes the jackscrew 16 to retract upward within the circular opening 20, thereby retracting the Teflon pad 62 away from the surface of the support structure and thereby allowing the wheels 32 to contact the support structure, so that the pool table carriage 10 may be easily rolled between various locations.

The lower tier 56B has a lower surface 58. The wheel assembly 18 is attached to said lower surface 58. The wheel assembly 18 comprises a coaster 34 having an axle 38, and also has a wheel 32. The wheel 32 selectively rotates around the axle 38 when the pool table carriage 10 is selectively rolled between various locations.

In an alternate embodiment, the extension plate 56 is not split into an upper tier 56A and a lower tier 56B, but rather, comprises one continuous horizontal extension plate extending outwardly from the top 46T of the connecting wall 46. In such an embodiment, as is the case for the embodiment illustrated in the drawing figures and described above, the jackscrews 16 may be more proximal to the connecting wall 46 than the wheel assemblies 18. An embodiment in which the wheel assemblies 18 are more proximal to the connecting walls 46 than the jackscrews 16 is additionally contemplated.

Figure 2:
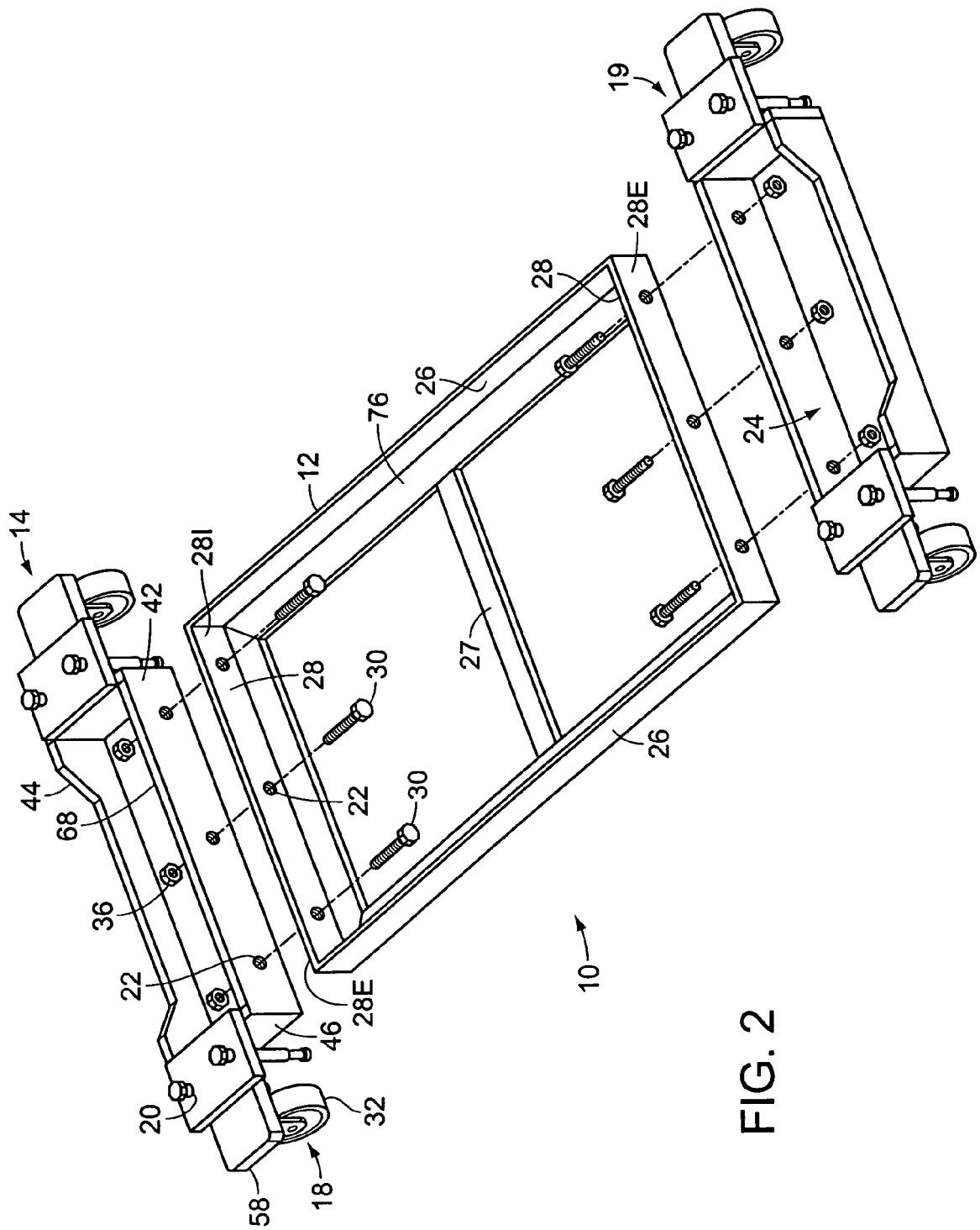
FIG. 2 is a perspective view of the pool table carriage prior to selective attachment of a main frame to each of two support plate assemblies.

The substantially rectangular main frame 12 selectively attaches the two support assemblies 14 to one another. FIG. 2 illustrates a pool table carriage 10, wherein the main frame 12 is positioned for selective attachment to each of the two support plate assemblies 14. The main frame 12 has two parallel longitudinal walls 26, and two shorter lateral walls 28 extending therebetween. The lateral walls 28 are substantially parallel to one another and rigidly connect the two longitudinal walls 26 to one another. The lateral walls 28 each have an exterior facing surface 28E which faces the interior wall 68 of the support plate assembly 14. The main frame 12 further has a crossbar 27 extending perpendicularly between the two longitudinal walls 26, for conferring additional strength and rigidity to the main frame 12. The longitudinal walls 26 and the lateral walls 28 each have a lower portion. The main frame 12 is additionally strengthened by four horizontal beams 76, which extend partially inwardly from said lower portions of the longitudinal walls 26 and the lateral walls 28.

Each lateral wall 28 has three holes 22 extending fully therethrough. Correspondingly, the interior walls 68 of each of the support plate assemblies 14 have three threaded holes 22 extending fully therethrough. The pool table carriage 10 has six attachment screws 30 and six threaded nuts 36, for selectively attaching the main frame 12 to each of the support plate assemblies 14. In particular, each of the lateral walls 28 of the main frame 12 is selectively attached to the interior wall 68 of one of the support plate assemblies 14 by placing the inner side 42 of the interior wall 68 flush against the exterior facing surface 28E of the lateral wall 28, by then aligning the three holes 22 within the support plate assembly 14 with the three holes 22 within each of the lateral walls 28 of the main frame 12, and by extending the attachment screws 30 fully through the lateral wall 28 and the interior wall 68, and threading each nut 36 onto one of the ends of the attachment screws 30, in order to prevent the screws 30 from inadvertently loosening.

Figure 3:
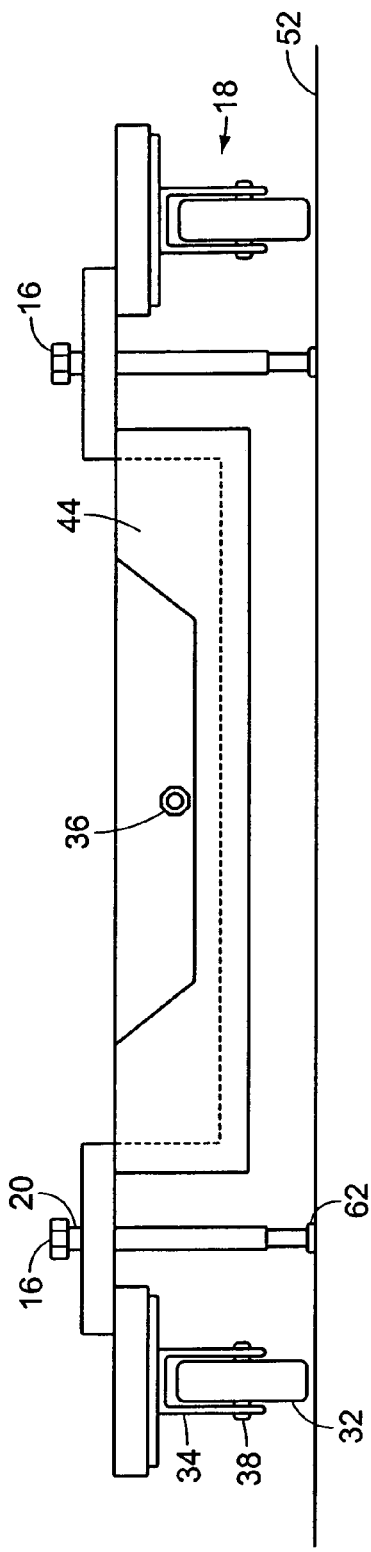
FIG. 3 is a side view of the pool table carriage, wherein the jackscrews have been partially selectively extended downward in order to partially lift the wheels above the floor, and thereby immobilize the pool table carriage.

FIG. 3 illustrates a side view of the pool table carriage 10, wherein each of the jackscrews 16 has been partially rotated in the direction which causes the jackscrews 16 to extend downward within the circular openings 20, in order to partially lift the wheels 32 above a horizontal floor 52 upon which the pool table carriage 10 rests. When the jackscrews 16 are so extended, the pool table carriage 10 is relatively immobile, and will not roll when an external force is applied.

Figure 4:
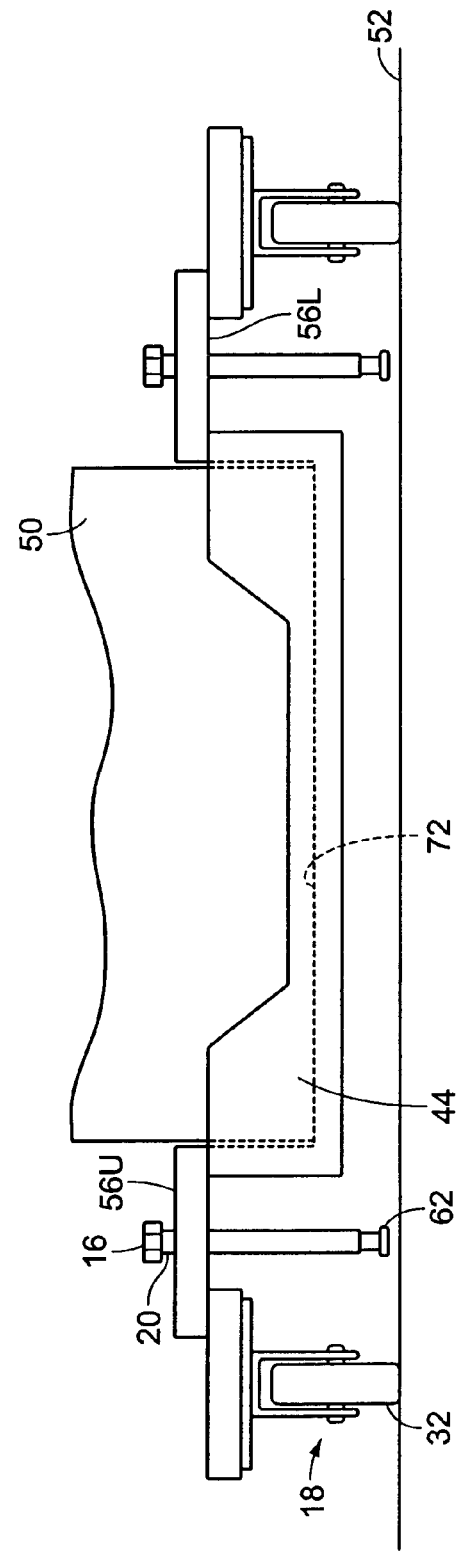
FIG. 4 is a side view of the pool table carriage, wherein the jackscrews have been partially selectively retracted in order to allow the wheels to contact the floor, and wherein a pool table, with parts broken away, is being supported upon the pool table carriage.

FIG. 4 illustrates a side view of the pool table carriage 10, wherein each of the jackscrews 16 has been partially rotated in the direction which causes the jackscrews 16 to extend upward within the circular openings 20, in order to lower the wheels 32 against the horizontal floor 52 upon which the pool table carriage 10 rests. A leg 50 of a pool table, with portions broken away, is being supported upon the base 72 of the rectangular leg support enclosure 24. When the jackscrews 16 are in this raised conformation, the pool table carriage 10 is easily rolled on its wheels 32 between various locations.

It should be noted that the jackscrews 16 serve a purpose in addition to selectively immobilizing the pool table carriage 10. Namely, the jackscrews 16 also may be used for maintaining the surface of the pool table "level." In this regard, because the jackscrews 16 are separately adjustable, the jackscrews 16 may be used to compensate for a "horizontal" support structure which is not entirely horizontal, by extending one or more of the jackscrews 16, until the surface of the pool table is precisely horizontal, so that a pool ball will not roll on the playing surface of the pool table other than when it is hit by a pool stick or follow an unexpected trajectory when in motion. It should be additionally noted that it is not necessary for the user to raise the wheels 32 fully off the floor 52 with the jackscrews 16 in order to immobilize the pool table carriage 10. Rather, the jackscrews 16 may be downwardly extended just enough to slightly raise the wheels 32 above the floor 52, in order to alleviate the weight of the pool table exerted upon the wheels 32, while still not permitting the pool table carriage 10 to roll.

Figure 5:
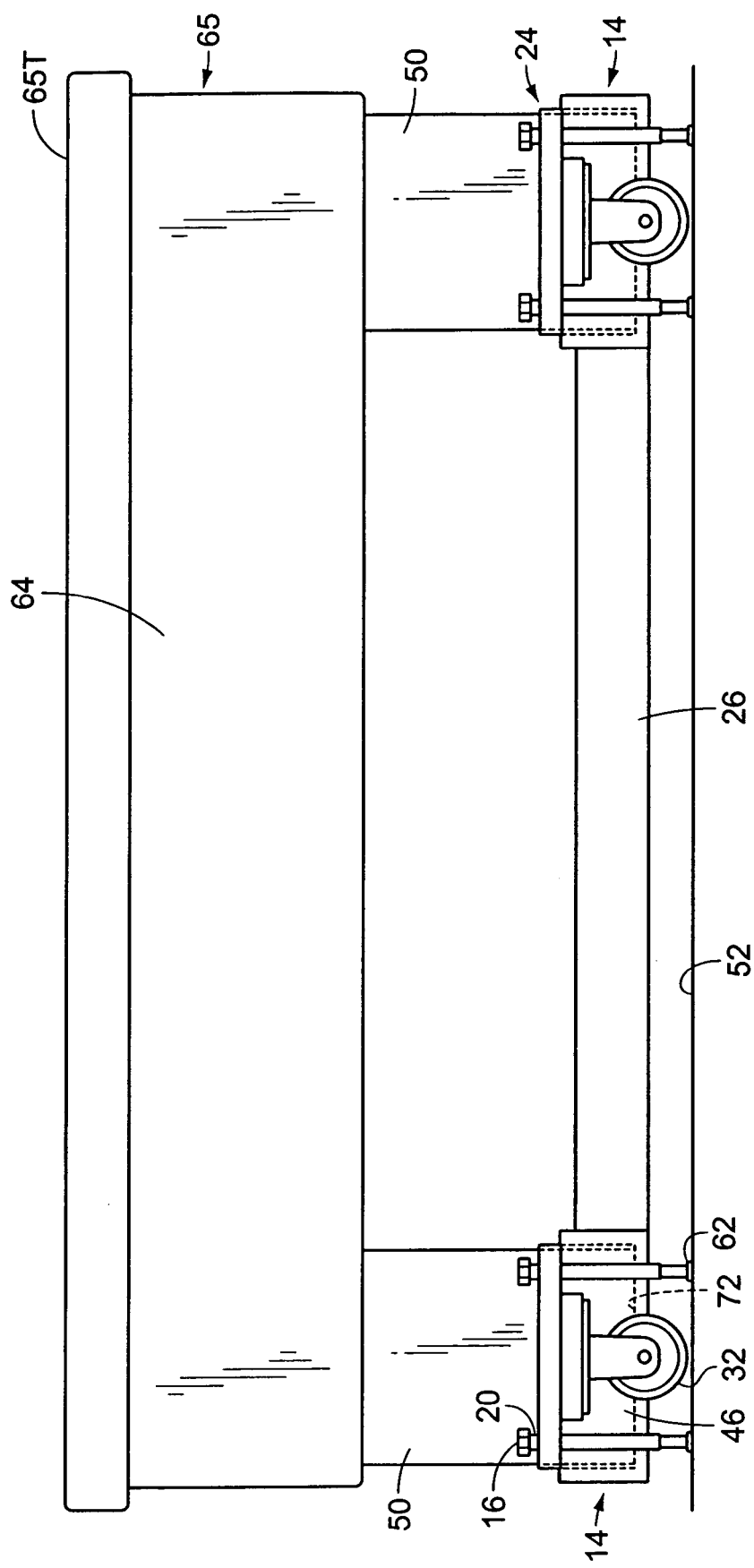
FIG. 5 is a front elevational view of the pool table carriage, wherein a pool table is being supported thereupon.

FIG. 5 illustrates the pool table carriage 10 wherein a pool table 65 is being fully supported thereon. In particular, each of the two legs 50 of the pool table 65 are resting upon the base 72 of the leg support enclosures 24 of each of the support plate assemblies 14. The long sides 64 of the pool table 65 extend substantially between the two support plate assemblies 14. The jackscrews 16 have been partially extended downward within their circular openings 20, thereby causing the wheels 32 to be lifted off of the floor 52, and thereby immobilizing the pool table carriage 10.

The pool table carriage 10 is preferably constructed from a strong, durable metal such as steel, and is provided in a variety of sizes so that it may be used for supporting and transporting pool tables having different sizes.

In use, a user attaches the mainframe 12 to each of the two support plate assemblies 14 by placing the inner side 42 of the interior wall 68 flush against the exterior facing surface 28E of the lateral wall 28, by then aligning the three threaded holes 22 within the support plate assembly 14 with the three threaded holes 22 within each of the lateral walls 28 of the main frame 12, and by subsequently threading the attachment screws 30 fully through the lateral wall 28 and the interior wall 68. The user orients the pool table carriage 10 on a horizontal support structure such as a floor, with the wheel assemblies 18 oriented downward. The user then lowers the legs 50 of the pool table 65 onto the bases 72 of the two leg support enclosures 24 located at opposite ends of the pool table carriage 10, and rolls the pool table carriage 10 and the pool table 65 supported thereupon, to any desired location. Once the pool table carriage 10 and pool table 65 have been suitably positioned, the user rotates the jackscrews 16 in the direction which causes the Teflon pads 62 of the jackscrews 16 to extend downward against the floor 52, thereby raising the wheels 32 above the floor 52, and immobilizing the pool table carriage 10. When the user wants to relocate the pool table carriage 10 and the pool table 65 resting thereupon, the user rotates the jackscrews 16 in the opposite direction, thereby causing the jackscrews 16 to retract within their circular openings 20, thereby allowing the wheels 32 to again contact the floor 52 so that the pool table carriage 10 may be easily rolled upon the wheels 32.

In conclusion, herein is presented a pool table carriage for supporting a pool table at an elevated position above a horizontal support structure such as a floor, and for easily transporting the pool table between various locations. The invention is illustrated by example in the drawing figures, and throughout the written description. It should be understood that numerous variations are possible, while adhering to the inventive concept. Such variations are contemplated as being a part of the present invention.

What is claimed is:

1. A pool table carriage, for selectively supporting a pool table at an elevated position above a horizontal support structure, and for easily transporting the pool table between various locations, said pool table having two long sides, two short sides, a substantially horizontal playing surface, and two legs for elevating said sides and said playing surface above the horizontal support structure, said pool table carriage comprising:

two substantially rectangular support plate assemblies, each having a substantially rectangular horizontal base having four edges, said support plate assembly also having an interior wall, an exterior wall, and two connecting walls, wherein each of said walls is substantially rectangular and extends vertically upward from one of the edges of said base, said connecting walls perpendicularly extending from and connecting the interior wall to the exterior wall, said walls and base together defining a box-like substantially rectangular leg support enclosure which is open at the top, in order that one of the legs of the pool table may be selectively lowered therein and supported upon the base, each support plate assembly having two jackscrew and wheel assemblies for selectively immobilizing the pool table carriage upon the horizontal support structure, wherein one of the jackscrew and wheel assemblies is attached to one of the connecting walls, and wherein the other jackscrew and wheel assembly is attached to the other connecting wall, each jackscrew and wheel assembly comprising:

an extension plate extending outwardly from the connecting wall, said extension plate having an upper and lower surface, said extension plate having at least one threaded circular opening extending fully between the upper surface and the lower surface;

a wheel assembly attached to said lower surface of the extension plate, said wheel assembly having a wheel which selectively rotates when the pool table carriage is selectively rolled between various locations; and at least one elongated, vertical rotatable jackscrew, for selectively raising the wheel above the surface of the support structure in order to immobilize the pool table carriage, said jackscrew having threads which match the threads of the at least one circular opening, said jackscrew extending fully through and threaded within said circular opening, each jackscrew having a first end, and also a second end which terminates in a pad which selectively contacts the floor, said pads for protecting the support structure from becoming damaged by the combined weight of the pool table carriage and the pool table, wherein each jackscrew has two opposing directions in which it may be rotated, wherein rotation of the jackscrew in one direction causes the jackscrew to extend downward within the circular openings until the pad pushes against the surface of the support structure and thereby causes the wheel assemblies and their associated wheels to be lifted above the support structure, thereby immobilizing the pool table carriage, and wherein rotation of the jackscrew in the opposite direction causes the jackscrew to extend upward within the circular opening, thereby retracting the pad away from the surface of the support structure and thereby allowing the wheels to contact the support structure, so that the pool table carriage may be easily rolled between various locations; and a substantially rectangular main frame which selectively extends between and attaches the two support assemblies to one another, said main frame having two parallel longitudinal walls, and two shorter lateral walls extending therebetween, wherein said lateral walls are substantially parallel to one another and rigidly connect the two longitudinal walls to one another, each of said lateral walls having an exterior facing surface which faces the interior wall of the support plate assembly.

2. The pool table carriage as recited in claim 1, wherein each jackscrew and wheel assembly has two vertical jackscrews.

3. The pool table carriage as recited in claim 2, wherein the pad at the second end of the jackscrew is constructed from Teflon.

4. The pool table carriage as recited in claim 3, wherein the pool table carriage is substantially constructed from steel.

5. The pool table carriage as recited in claim 4, wherein the lateral walls of the main frame and the interior walls of the support plate assemblies each have at least one threaded hole extending fully therethrough, and wherein the pool table carriage has at least two attachment screws which are selectively threaded within the threaded holes, for selectively attaching the lateral walls of the main frame to the interior walls of the support plate assemblies.

6. The pool table carriage as recited in claim 5, wherein the main frame has a crossbar extending perpendicularly between the two longitudinal walls, for conferring additional strength and rigidity to the main frame.

7. The pool table carriage as recited in claim 6, wherein each of the two connecting walls has a top and wherein the extension plate extends outwardly from the top of the connecting wall.

8. The pool table carriage as recited in claim 7, wherein the longitudinal walls and the lateral walls each have a lower portion, and wherein the main frame is additionally strengthened by four horizontal beams extending partially inwardly from said lower portions of the longitudinal walls and the lateral walls.

9. The pool table carriage as recited in claim 8, wherein the jackscrews are more proximal to the connecting wall than the wheel assemblies.

10. The pool table carriage as recited in claim 8, wherein the wheel assemblies are more proximal to the connecting walls than the jackscrews.

11. A method of using a pool table carriage by a user, for supporting a pool table at an elevated position above a horizontal support structure and for transporting the pool table between various locations, in conjunction with a pool table having two long sides, two short sides, a substantially horizontal playing surface, and two legs for elevating said sides and said playing surface above the horizontal support structure, said pool table carriage having two support plate assemblies and a main frame interposed therebetween, each support plate assembly having a leg support enclosure having a base, each support plate assembly also having at least two selectively extendable jackscrews each having two directions of rotation, and two wheel assemblies each having wheels, said method comprising the steps of:

a) attaching the mainframe between each of the two support plate assemblies;

b) orienting the pool table carriage on a horizontal support structure, with the wheels oriented downward;

c) positioning the legs of the pool table upon the bases of the two leg support enclosures;

d) rotating the jackscrews in the direction which causes the jackscrews to extend upwards, thereby allowing the wheels to contact the floor so that the pool table carriage may be easily rolled upon the wheels;

e) rolling the pool table carriage and the pool table supported thereupon to any desired location; and f) immobilizing the pool table carriage at the desired location by raising the wheels above the floor by rotating the jackscrews in the direction which causes the jackscrews to extend downward against the support structure.

\* \* \* \* \*